Dec. 20, 1927.
O. A. KOENIG
1,653,108
SURFACING MACHINE
Filed April 29, 1926
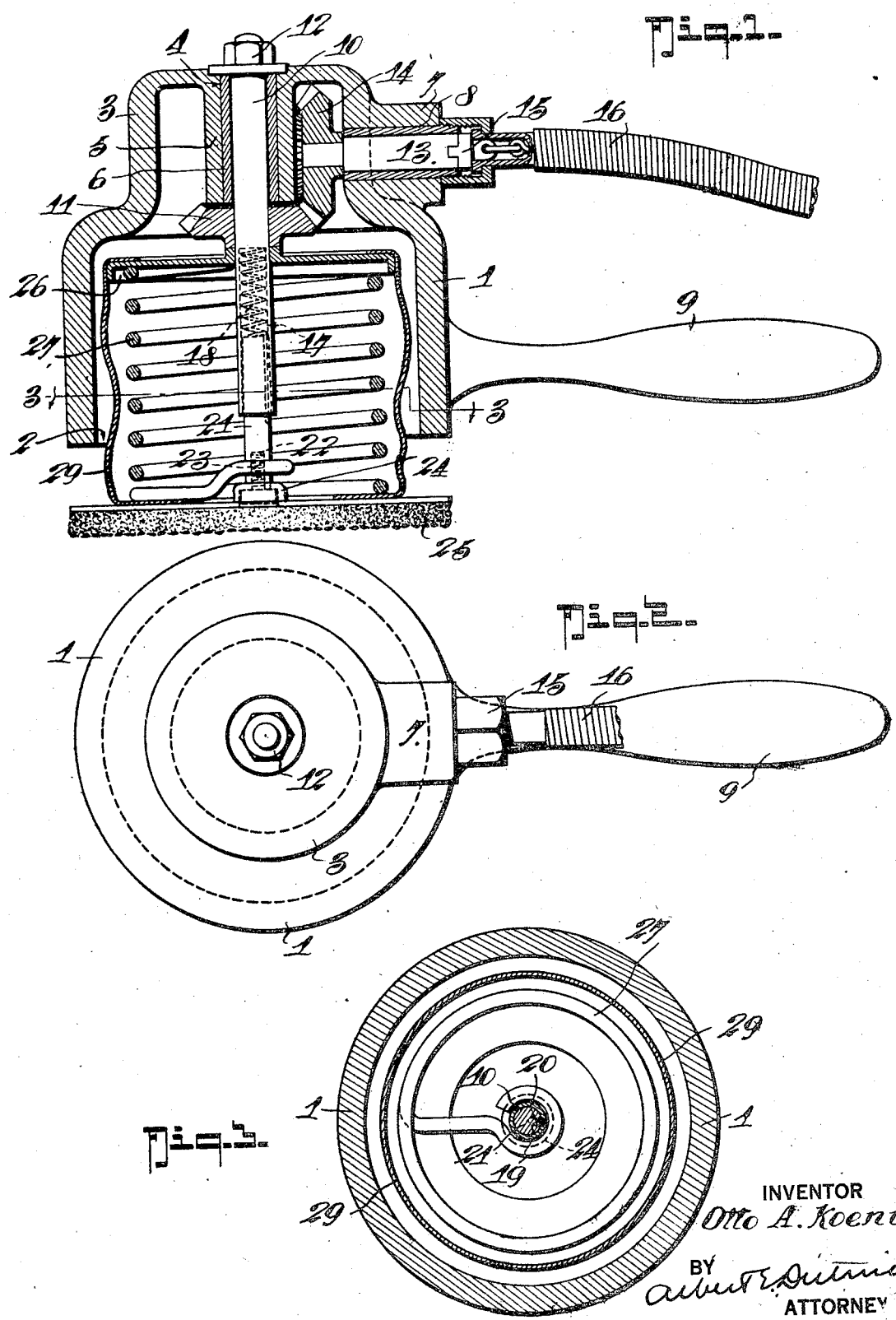
INVENTOR
Otto A. Koenig.
BY
ATTORNEY Patented Dec. 20, 1927.

1,653,108

UNITED STATES PATENT OFFICE.

OTTO ALFRED KOENIG, OF SAN FRANCISCO, CALIFORNIA.

SURFACING MACHINE.

Application filed April 29, 1926. Serial No. 105,517.

The invention generally relates to power operated surfacing machines, and more particularly to that type of such machines which is adaptable to be hand manipulated and by which the surfacing is accomplished with a rotary motion, or a rotary motion plus a reciprocatory motion hand applied.

In its more detailed nature, the invention seeks to provide a surfacing machine adaptable for use in surfacing enamelled surfaces such as are provided on automobiles and the like, and which is of the hand manipulated rotary type comprising a small body light of weight and easy to handle, and a rotary disk of felt or other suitable material for applying an abrading rotary contact to the surface to be finished, and in which yieldable means is provided for ensuring perfect contact of the disk with the surface being worked upon.

With the above and other objects in view that will hereinafter appear, the invention further resides in the novel details of construction, combination and arrangement of parts, all of which will be first fully described, then be particularly pointed out in the appended claims, reference being had to the accompanying drawing, in which:—

Figure 1 is a central vertical section of the invention.

Figure 2 is a plan view.

Figure 3 is a horizontal section taken on the line 3—3 on Figure 1.

In the drawing, 1 represents the housing of the device which is in the nature of a cup-shaped body open at its lower end as at 2 and having the upper end thereof closed and dome-shape as at 3. The closed end of the housing body is provided with a central bore 4 which passes through the bearing hub 5 provided with a suitable bearing bushing 6.

A lateral bearing bore 7 is provided at one side wall of the housing body which is also bored and provided with a sleeve bearing 8.

A handle 9 is formed integral with one wall of the housing whereby the device may be hand manipulated for its intended purpose of surfacing automobiles or other finished planes.

A shaft section 10 is rotatable in the sleeve bearing 6 and has secured thereupon in any approved manner a bevelled gear 11 at one end of the bearing hub 5, the other end of the shaft being secured in its rotatable relation in the said bearing as at 12.

Another shaft section 13 is secured in the lateral bearing 7 and has secured in the end thereof, which is projected into the interior of the housing 1, a bevelled gear 14 adapted to mesh with and impart rotation to the gear 11 and therethrough to the shaft section 10.

The shaft section 13 is adapted to be connected, through the flexible shafting connection 15 mounted in the flexible housing 16 with any suitable source of power, such as an electric motor (not shown).

The lower end of the shaft section 10 is hollow to receive a cushion spring 18 and is provided with a key or spline 19 to cooperate with the key slot 20 formed in the telescopic shaft section 21 to mount the said last named section in rotative telescopic relation upon the said shaft section 10.

The telescopic section 21 is provided at its lowermost end with a threaded socket 22 to receive the threaded shank 23 which projects vertically from the central enlargement of the strengthening head or disk 24 which is constructed of thin metal to permit a degree of surface conforming flexure and to which the surfacing disk 25 of felt or other suitable material is secured in any approved manner.

A flanged abutment plate 26 is secured upon the shaft section 10 just below the gear 11 and serves as the upper abutment for a cushion spring 27 which encircles the shaft 10—21 below the plate 26 and which is adapted to exert pressure on the peripheral portion of the flexible disk 24. The said spring has a portion of the lowermost coil thereof bent inwardly and slightly upwardly to encircle the telescopic section 21 to serve as a means for centering the said spring without exerting pressure centrally.

If desired a casing 29 of leather, or other suitable material, may be mounted over the abutment plate 26, spring 27 and telescopic section 21 to encase the said parts from contact with any abrasive compound being used on the surface to be prepared.

The device above described is adaptable for use in the rubbing or surfacing of hard enamelled or japanned surfaces on automobiles or the like. So far as I am aware, this work is at present done successfully by hand only and hence to provide a simple and efficient power driven device such as I have herein disclosed is a great advancement in economy of labor and time.

The surfacing disk is rotated at a speed of approximately 1800 revolutions per minute, and by reason of the compact nature of the device and the handle with which the same is provided, the device may be easily manipulated to bring to bear both a reciprocatory motion, set up by the hand of the user, and a rotary motion imparted to the disk as described.

Pumice stone and water are preferably applied to the surface during the surfacing operation but it is, of course, understood that any other suitable surfacing compound may be used.

The central cushion spring 18 serves to exert a downward pressure at the center of the flexible disk 24 while the large spring 27 exerts a similar pressure on the peripheral portion of the disk, thus ensuring perfect surface conforming contact of the disk with the surface being worked upon. By providing the inturned encircling portion 28 of the spring and bending the same slightly upwardly a central support is provided for that spring without causing the same to exert any pressure near the center of the disk.

The housing 16 and the flexible drive means 15 encased thereby may be made about 3½ feet in length and driven by a ¼ horse power motor which, if it is desired, may be carried by the operator supported upon his shoulders and secured in any approved manner to facilitate such use of the device, power being applied to the motor from any remote source. As these features form no part of the invention a detailed illustration thereof is deemed unnecessary.

By providing the rubber or leather casing 29, the parts of the mechanism encased thereby are protected against water and pumice stone or other abrasive compounds that might be employed.

By providing the thin flexible disk 24 and the double springs for exerting independent central and peripheral pressures on said disk, means is provided not only to prevent the disk from reversely dishing away from the work, but also to permit such slight flexures of that disk as will assure perfect surface conforming contact with equal pressure exertion throughout.

From the foregoing description, taken in connection with the accompanying drawing, it is thought that the novel details of construction, manner of use and the advantages of the invention will be readily apparent to those skilled in the art to which it relates.

What I claim is:

1. A device of the class described comprising a housing, a shaft section rotatably mounted in the housing, means for imparting rotation to the shaft section from a remote source of power, said shaft section having a hollowed end, a telescopic section mounted in and projected from the hollowed end of the shaft section, a spring in the hollowed end behind the telescopic section, an abutment head carried by the shaft section, a flexible surfacing disk carried by the telescopic section, and a coil spring interposed between the disk and the abutment in position for exerting its pressure upon the peripheral portion of the disk to force said portion against the work, whereby tendency of the disk to reversely dish is prevented and surface conforming contact is provided for.

2. A device of the class described comprising a housing, a shaft section rotatably mounted in the housing, means for imparting rotation to the shaft section from a remote source of power, said shaft section having a hollowed end, a telescopic section mounted in and projected from the hollowed end of the shaft section, a spring in the hollowed end behind the telescopic section, an abutment head carried by the shaft section, a flexible surfacing disk carried by the telescopic section, a coil spring interposed between the disk and the abutment in position for exerting its pressure upon the peripheral portion of the disk to force said portion against the work, the lowermost coil of said coil spring having a portion extending inwardly and upwardly and surrounding the telescopic section above and out of contact with the disk to centrally locate said coil spring while providing against exertion of its spring tendency at the center of the disk.

3. A device of the class described comprising a housing, a shaft section rotatably mounted in the housing, means for imparting rotation to the shaft section from a remote source of power, said shaft section having a hollowed end, a telescopic section mounted in and projected from the hollowed end of the shaft section, a spring in the hollowed end behind the telescopic section, an abutment head carried by the shaft section, a flexible surfacing disk carried by the telescopic section, a coil spring interposed between the disk and the abutment in position for exerting its pressure upon the peripheral portion of the disk to force said portion against the work, the lowermost coil of said coil spring having a portion extending inwardly and upwardly and surrounding the telescopic section above and out of contact with the disk to centrally locate said coil spring while providing against exertion of its spring tendency at the center of the disk, said telescopic section having a tapped socket in its extended end, said disk including a mounting plate of thin material to which the said disk is secured and which has a non-circular socket, and a non-circular headed bolt having its head seated in the socket and its shank threaded into the tapped socket to mount the plate and disk upon the telescopic section to rotate therewith.

OTTO ALFRED KOENIG.